United States Patent [19]

Palm

[11] Patent Number: 5,742,291
[45] Date of Patent: Apr. 21, 1998

[54] METHOD AND APPARATUS FOR CREATION OF THREE-DIMENSIONAL WIRE FRAMES

[75] Inventor: Charles S. Palm, Westlake Village, Calif.

[73] Assignee: Synthonics Incorporated, Westlake Village, Calif.

[21] Appl. No.: 437,771

[22] Filed: May 9, 1995

[51] Int. Cl.$^6$ .................................................. G06T 17/20
[52] U.S. Cl. ........................................ 345/420; 345/141
[58] Field of Search .................................... 395/119, 120, 395/155, 117–20, 141–3; 364/468.03, 468.04, 578

[56] References Cited

U.S. PATENT DOCUMENTS 4,995,716  2/1991  Warnicki et al. ....................... 351/212
5,159,361  10/1992  Cambier et al. ....................... 351/212

OTHER PUBLICATIONS

Beir, et al, "Toolglass and Magic Lenses: The See–Through Interface", Siggraph Proceedings, pp. 73–80, Aug. 1993.
Zeleznik, et al, "An Interactive 3D Toolkit for Constructing Widgets" Siggraph Proceedings pp. 81–84, Aug. 1993.
Tehnical Designs, 3D People, Brochure, 1991.
3D Artist, Apr. 1994, "The News in 3D: People for People (and Especially for Architects)", p. 3 and reprint. Entire artical.
"Characters/People", catalog, vol. III, Viewpoint DataLabs International, 625 S. State Street, Orem, UT, selected excerpts, 1994.
John Ellis author, "Multimedia Tips Techniques" *Multimedia Producer*, Oct. 1994, S–6.
Noumenon Labs; "Real World Objects Catalog"; Dallas, Texas, c.1993.
Schreiber Instruments, Inc.; "Imagine 3D People"; software manual; c. 1993.
Autodesk, Inc. ; "Autodesk 3D Studio: Tutorials"; pp. 1–32, 311–334; 1990, 91.

Michelle Bousquet, "Guide to 3D People", *Multicad*, Mar., 1994.
Morrison, Mike, "The Magic of Image Processing", *SAMS Publishing*, 1993, pp. 63–191.
Wagstaff, Sean, Strata StudioPro animator layers on 3–D capabilities; all–in–one 3–D application models, animates with splines, ( Strata Inc.), *MacWEEK* Dec. 13, 1993, v7, n48, p. 62(2), Coastal Associates Publishing L.P. 1993.
Watson, Jon, "Molding Models With PixelPutty Solo", (PixelPutty Solo 1.2 for Macintosh), *Computer Graphics World*, v18, n5, p. 69(2), May 1995.
Maestri, George, "Improvements to the studio: Autodesk 3D Studio Release 4—A great program just got better. With Inverse Kinematics, Camera Control, Perspective Matching and Custom Scripting, 3D Studio . . . ", (Autodesk's 3D Studio) *Digital Video Magazine*, Mar. 1, 1995, v3, n3, pp. 62–66.
3D Studio Release 4, Product description, (Autodesk, Inc.), source: Datapro Software Directory, Creation date: Aug. 10, 1995.
Billups, Scott, "Silicon Stars", (Fractal Design's Poser), *Product Analysis Review, Videography*, v20, n4, p. 110(4), Apr. 1995.

(List continued on next page.)

Primary Examiner—Phu K. Nguyen
Assistant Examiner—Rudolph J. Buchel
Attorney, Agent, or Firm—Lowe, Price, LeBlanc & Becker

[57] ABSTRACT

Methods and apparatus are disclosed for the rapid creation of wire frame representations of 3-dimensional objects using generic wire frames which are prototypical of a class of objects and which are modifiable to correspond to a specific instance of the class. A set of generic wire frames are bundled as a tool kit with software for editing wire frames. A method of morphing from a source 3-dimensional stereo rendered wire frame to a target rendered wire frame is also disclosed and the apparent camera viewpoint can change during morphing.

8 Claims, 13 Drawing Sheets

OTHER PUBLICATIONS

Lee, et al., "Image Morphing Using Deformable Surfaces", *Computer Animation, 1994 Proceedings, IEEE,* pp. 31–39.

Foley, James D., et al, "Computer Graphics: Principles and Practices", Addison–Wesley Publishing Co., 2nd ed. pp. 491–504, 1990.

Jones, et al, "A New Shape Representation for Fast Reconstruction from Multiple 2D Perspective Images", *IEE Colloq.New Developments in 3D Image Capture and Application,* May 3, 1995, Digest No. 1995/092, pp. 4/1–3.

Ohya, et al, "Real–time Reproduction of 3D Human Images in Virtual Space Teleconferencing", *Virtual Reality, 1993 International Symposium, IEEE,* pp. 408–414.

Hsu, et al, "Human Arm Modeling for Analysis/Synthesis Image Coding", *Robot and Human Communication, 1993 International Workshop,* pp. 352–355.

Pogue, David, "Poser 1.0.", (Fractal Design Corp 3–D illustration software), *Macworld,* Oct. 1995, v12, n10, p. 63.

Long, Ben, "PixelPutty Solo: feature–rich low–cost 3–D modeler boasts unique animation tools", (The Valis Group), *MacUser,* Nov. 1995, v11, n11, p. 58.

Erickson, et al, Simulation gets a new look, (Computer Generated Synthesized Imagery), Defense Electronics, v16, p. 76(9), Aug., 1984.

Long, Ben, "Utilities 1.0: novices, pros will benefit from multimedia tools", (Motion Works International's package of six multimedia applications), *MacWEEK,* Jan. 30, 1995, v9, n5, p. 30.

Grotta, et al, "Elastic Reality: the power to morph like the pros", (ASDG, Inc), PC Magazine, Nov. 8, 1994, v13, n19, p. 50.

Prosise, Jeff, "Morphing: magic on your PC", *PC Magazine,* Jun. 14, 1994, v13, n11, pp. 325–329.

Hall, Valerie, "Morphing in 2–D and 3–D", (includes related articles on morphing in films, on Rmorf shareware morphing software and on two–pass mesh warping algorithm), *Dr. Dobb's Journal,* Jul. 1993, v18, n7, pp. 18–27.

POINT DATABASE

| POINT NUMBER | LEFT IMAGE | RIGHT IMAGE | REAL WORLD | PREDECESSOR | SUCCESSOR |
|---|---|---|---|---|---|
| . | . | | | | |
| . | . | | | | |
| . | . | | | | |
| 32 | (45, 125) | (48, 129) | (12.5, 14.1, 22.0) | 31 | 33 |

Figure 8

METHOD AND APPARATUS FOR CREATION OF THREE-DIMENSIONAL WIRE FRAMES

CROSS REFERENCE TO RELATED APPLICATIONS

This application is related to application Ser. No. 08/327,471, filed Oct. 21, 1994, by Bruce W. Binns, Charles S. Palm and Suzanne E. Weaver for "METHODS AND APPARATUS FOR RAPIDLY RENDERING PHOTO-REALISTIC SURFACES ON 3-DIMENSIONAL WIRE FLAMES AUTOMATICALLY" (Docket No. 2345-003) which is hereby incorporated by reference in its entirety.

This application is also related to application Ser. No. 08/414,651, filed Mar. 31, 1995, by Charles S. Palm for "METHODS AND APPARATUS FOR USING IMAGE DATA TO DETERMINE CAMERA LOCATION AND ORIENTATION" (Docket No. 2345-005) which is hereby incorporated by reference in its entirety.

This application is also related to application Ser. No. 08/318,047, filed Oct. 4, 1994, by Bruce W. Binns, Rodney M. Price, Charles S. Palm and Suzanne E. Weaver for "METHOD AND APPARATUS FOR INTERACTIVE IMAGE CORRELATION FOR THREE DIMENSIONAL IMAGE PRODUCTION" (Docket No. 2345-001) which is hereby incorporated by reference in its entirety.

TECHNICAL FIELD

This invention relates to the field of image processing and more particularly to methods and apparatus for the rapid creation and rendering of three-dimensional wire frames.

BACKGROUND OF THE INVENTION

The creation, manipulation and use of computer representations of three-dimensional objects has considerable utility in a number of technological endeavors. For example, in computer assisted design, it is convenient to be able to create computerized representations of objects ranging in size from very large buildings to automobiles to components having microgeometries. In computer animation, it is desirable to have a three-dimensional representation of an object when preparing perspective views of three-dimensional scenes. Typically, three-dimensional objects are represented for computerized manipulation and use as a "wire frame" A wire frame consists of a number of vertices (i. e., points) in three-dimensional space specified with reference to a coordinate system. The points in three-dimensional space are typically joined by lines to create sets of linked or related polygons. Each polygon usually represents a generally flat surface element depicting a portion of the object being represented. Preferably, for certain applications, the surface polygons are triangular because one can guarantee that three points will lie in the same plane. Certain commercial software packages, however, utilize a rectangle or polygons of order higher than 4 as long as the vertices lie in the same plane.

The resolution of a wire frame is determined by the number of vertices and their spacing. If a large number of surface elements are utilized and each surface element is very small, then the three-dimensional wire frame will approximate very closely the surface of the object being represented. On the other hand, if there are few points and the surface elements are large, the representation of the object will miss details which are smaller than the minimum size of the surface element. This is analogous to trying to represent a chair utilizing one foot square pieces of cardboard linked together. Such a representation would be very crude at best. However, if one were to represent a chair using the rectangular areas bounded by the thread of a slip cover, the representation would be much finer and would capture much more detail than would be permitted by the one foot squares of cardboard.

One of the problems of representing wire frames has to do with identifying point locations on a smoothly varying contour. On a smooth contour there are no reference points which are easily identifiable from image views taken from different perspectives. Therefore, it is difficult to identify corresponding points on two images for calculating depth.

In the prior art, there is some difficulty generating life-like wire frame representations of faces. This is because some judgment is required as to the selection of which points to utilize as vertices for the representation and also because the rendering of a 3-D surface of wire frame of a face (that is, the placement of a "skin" over a wire frame) does not result in a realistic presentation. The traditional rendering techniques simply pick a solid color and texture and render it with various lighting and shadow differences. The color is so uniform as to be patently artificial. Further, in the prior art, there is a trade-off between the coarseness of the wire frame and the rendering techniques utilized. Very high resolution wire frames permit traditional rendering techniques to create a more acceptable rendition than coarse wire frames. A coarse wire frame adds unnatural discontinuities at surface element boundaries to the artificiality of uniform texture and color.

Further, the prior art does not possess the capability to change camera (viewer) view point such as by zooming during a morphing sequence in which one stereo image is changed into another.

DISCLOSURE OF THE INVENTION

Against this background, one advantage to be achieved by the invention is a reduction in the difficulty required to create wire frames for particular classes of objects.

A second advantage achieved by the invention is an increase in speed with which wire frames can be prepared.

Another advantage of the invention involves identifying vertices for a wire frame on smooth contours of a surface to be represented.

Another advantage achieved by the invention is the creation of life-like surface renderings of wire frame representations, particularly the realistic rendering of wire frames of faces.

Another advantage achieved by the invention is the realistic representation of objects using a coarse resolution wire frame by providing realistic rendering.

Another object of the invention is to achieve threedimensional stereo morphing.

The invention relates to a method of creating wire frames by projecting a pattern on an object to be captured in a wire frame representation, capturing images from at least two perspectives of said object with the projected pattern visible in said images using portions of said projected patterns as reference points for calculation of location information about a point on the surface of said object. The pattern projected can be a grid or a multicolor confetti pattern comprising nonuniformly spaced bright spots of substantially random color. The resolution of the pattern is variable and may be selected either when projected or after projection when sampling points of the pattern for inclusion in the wire frame.

The invention is also directed to apparatus for rapidly creating wire frame representations of three dimensional objects including a computer having and input/output device, a display, a memory and mass storage; generic wire frames stored on said mass storage; and software for editing said generic wire frames to create said wire frame representation. The generic wire frames may be arranged as a tool kit having a plurality of wire frames generic to a respective plurality of different objects.

Software for editing wire frames includes functionality for selecting a vertex of a generic wire frame and for dragging the position of said vertex from one location on the display to another location, for adding a vertex between two vertices of a wire frame and for deleting a vertex between two vertices of a wire frame. When a vertex is deleted, database entries of predecessor and successor vertices are altered to reflect proper relationships.

The invention is also directed to a method of rapidly creating a custom wire frame of a three dimensional object by displaying at least one view of a generic wire frame typical of the class of objects to which said three dimensional object belongs, aligning said at least one view of said generic wire frame so that the perspective of a view corresponds with and overlays the perspective of an image of said object also displayed and orienting said view of said generic wire frame so that it has at least one point in common with said image and modifying at least one vertex of said view of said generic wire frame by dragging a vertex from its original position in the generic wire frame and dropping said vertex on a corresponding point of said image. The custom wire frame is rendered using transformed bit mapped portions of said image.

The invention is also directed to a method of reducing the number of points required to achieve an acceptable display of a rendered three dimensional wire frame reducing the number of vertices with which the three dimensional wire frame is represented and rendering said wire frame using transformed bit mapped portions of an image of the object represented by said wire frame.

The invention is also directed to a wire frame tool kit made up of a storage medium, and a plurality of wire frames stored on said storage medium representing respective prototypes of classes of three dimensional objects.

The invention is also directed to a method of morphing from a source three dimensional stereo rendered wire frame image to a target three dimensional stereo rendered wire frame image by identifying a plurality of point pairs on said source and target rendered stereo wire frame images by selecting one vertex on a source wire frame and a corresponding vertex on the target wire frame for each point pair, determining for each point pair, a vector from said vertex on the source image to said corresponding vertex on the target image, defining a plurality of intermediate frames, each intermediate frame comprising a wire frame having respective vertices proportionally displaced from source frame vertices toward said target frame vertices along said vectors; and rendering said intermediate frames using rendering information taken partially from said rendered source wire frame and partially from said rendered target wire frame.

The invention is also directed to a method of morphing a source three dimensional stereo rendered wire frame image having an apparent camera viewpoint to a target three dimensional stereo rendered wire frame image having a different apparent camera viewpoint. This is done by mapping the source wireframe into a target wireframe by way of one or more intermediate frames having respective vertices proportionally displaced from source frame vertices toward target frame vertices. Rendering information partially from said rendered source wire frame and partially from said rendered target wire frames is used. The apparent camera viewpoint of the wireframe changes during said mapping. Changing of said apparent camera viewpoint involves one of zooming in or out on said wireframe, rotating said apparent camera viewpoint about the wireframe, or both zooming and rotating.

Still other objects and advantages of the present invention will become readily apparent to those skilled in the art from the following detailed description, in which only the preferred embodiment of the invention is shown and described, simply by way of illustration of the best mode contemplated of carrying out the invention. As will be realized, the invention is capable of other and different embodiments and its several details are capable of modifications in various obvious respects, all without departing from the invention. Accordingly, the drawing and description are to be regarded as illustrative in nature and not as restrictive.

BRIEF DESCRIPTION OF DRAWING

FIG. 8 is an illustration of a data base entry for a data base of wire frame vertices.

BEST MODE FOR CARRYING OUT THE INVENTION

Figure 1:
FIG. 1 is an illustration of one view of a face to be utilized to create a wire frame representation.

The creation of a wire frame representation of a complex image, such as that shown in FIG. 1, is difficult because a large number of vertices must be defined to give a realistic approximation of the overall structure of the complex object, such as that of a head. As described herein and in the aforesaid patent applications, one way of identifying the location of points in a three-dimensional space involves the use of two images, captured from two different perspectives. By identifying corresponding points on the two images, and by knowing certain information about the camera locations, one can calculate the location of the common point in a three-dimensional coordinate system.

To create a wire frame representation of a complex object such as a head in a three-dimensional coordinate system therefore requires a tedious process by which two images are viewed in corresponding points on those two images or identified, one set of points at a time, and for each set of points a calculation is undertaken to identify the location of that point in the three-dimensional coordinate system. A data base of points in the three-dimensional coordinate system then is utilized to define the vertices of a wire frame representation. For complex surfaces, it may be necessary to identify hundreds or thousands of points in order to create a realistic wire frame representation. This is a long and tedious process which deters ready use of the technology.

Figure 2:
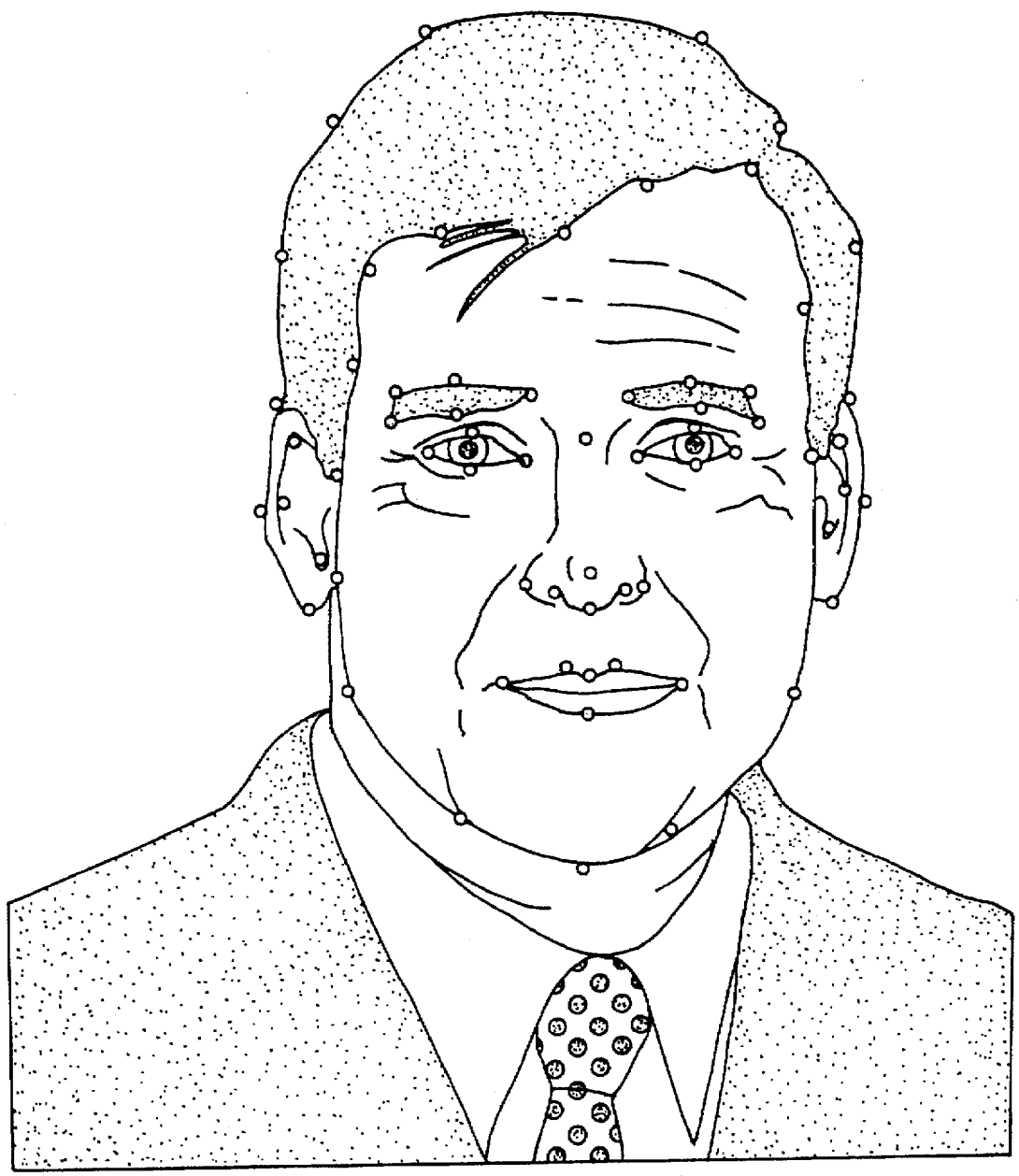
FIG. 2 is an illustration of the face shown in FIG. 1 showing the placement of certain wire frame vertices at certain points important to a realistic wire frame representation of a face.

FIG. 2 illustrates the image of FIG. 1 with several points identified which might be utilized in the capture of the wire frame of the face shown in FIG. 1.

Another problem associated with the capture of three-dimensional wire frames is the fact that some objects contain large areas of smooth surfaces without identifying characteristics thus making it difficult to identify corresponding points in the images captured from different perspectives. For example, in FIG. 2, the cheek areas lack any significant detail which could serve as landmarks for identifying the corresponding point in two images captured from different perspectives. Thus, accurate profile information is difficult to obtain for such smooth areas.

Figure 3:
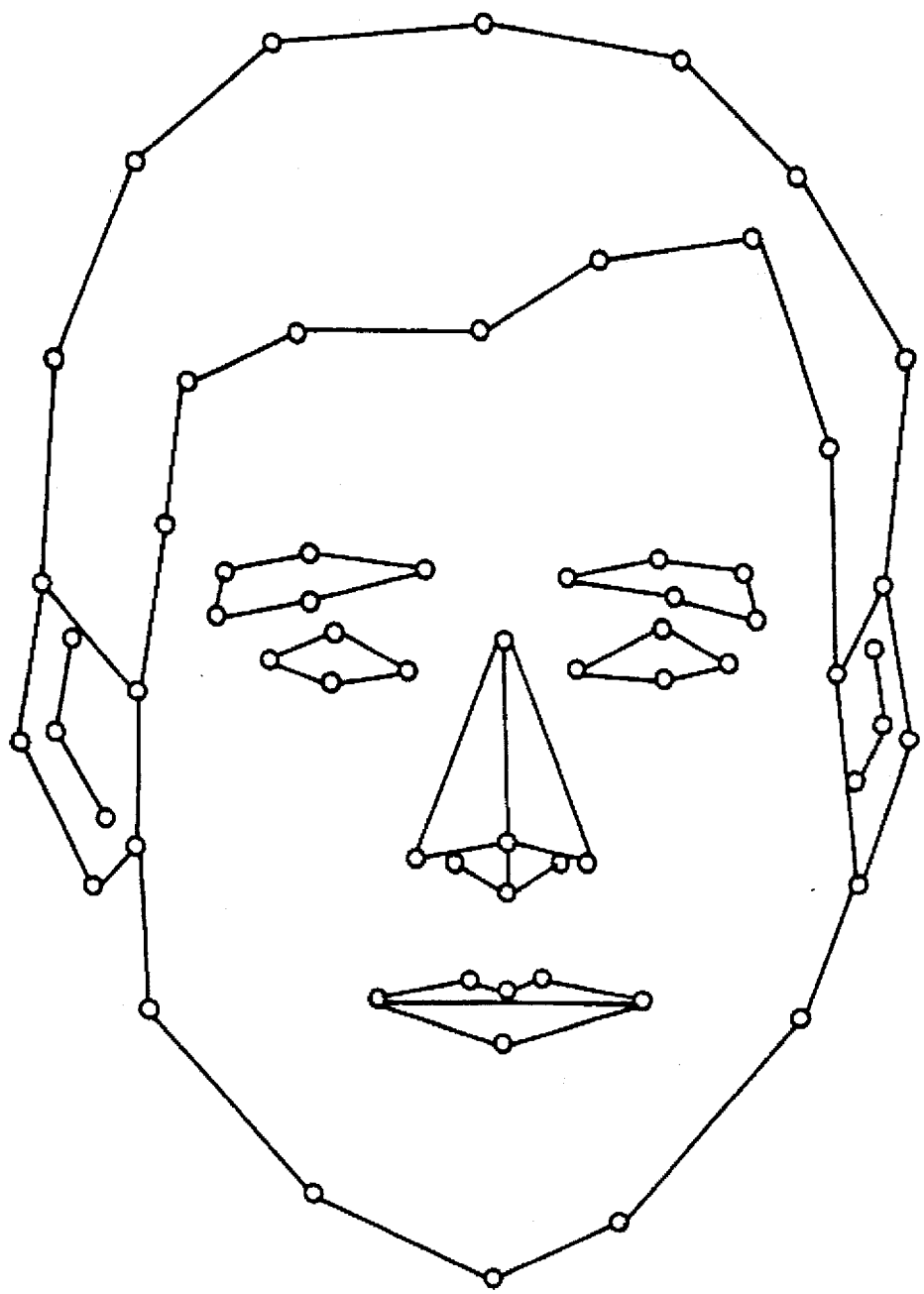
FIG. 3 is an illustration of certain wire frame vertices shown in FIG. 2.

FIG. 3 illustrates a perspective view of the wire, frame vertices depicted in FIG. 2. As one can see from FIG. 3, a wire frame, while capturing depth information, lacks surface detail necessary to render a realistic object. The process of adding surface detail to a wire frame, analogous to placing a skin over the wire frame so it appears real is called "rendering." A particular advantageous technique for rendering wire 35 frames in accordance with the invention is found in application Ser. No. 08/327,471 filed Oct. 21, 1994 by Bruce W. Binns, Charles S. Palm and Suzanne E. Weaver and entitled "Methods and Apparatus for Rapidly Rendering Photo-Realistic Surfaces on 3-Dimensional Wire Frames Automatically" (Docket No. 2345-003). The realistic nature of the rendering described in this application permits realistic representations even when relatively few vertices are utilized in the wire frame because the surface representations transformed appropriately for orientation give realistic cues to depth that would otherwise be missing. Thus, using the rendering techniques of the aforesaid application, fewer vertices may be selected which enables easier wire frame capture because not so many point sets need to be processed. Such rendering also relaxes the processing requirements on the image processing software and hardware because fewer points need to be processed. When the wire frame of FIG. 3 is appropriately rendered, the objective, of course, is to give a reconstructed appearance like unto to that shown in FIG. 1 which, because the wire frame representation can be rotated or otherwise manipulated in three-dimensional space, permits either three-dimensional stereo or regular perspective viewing.

Figure 4A:
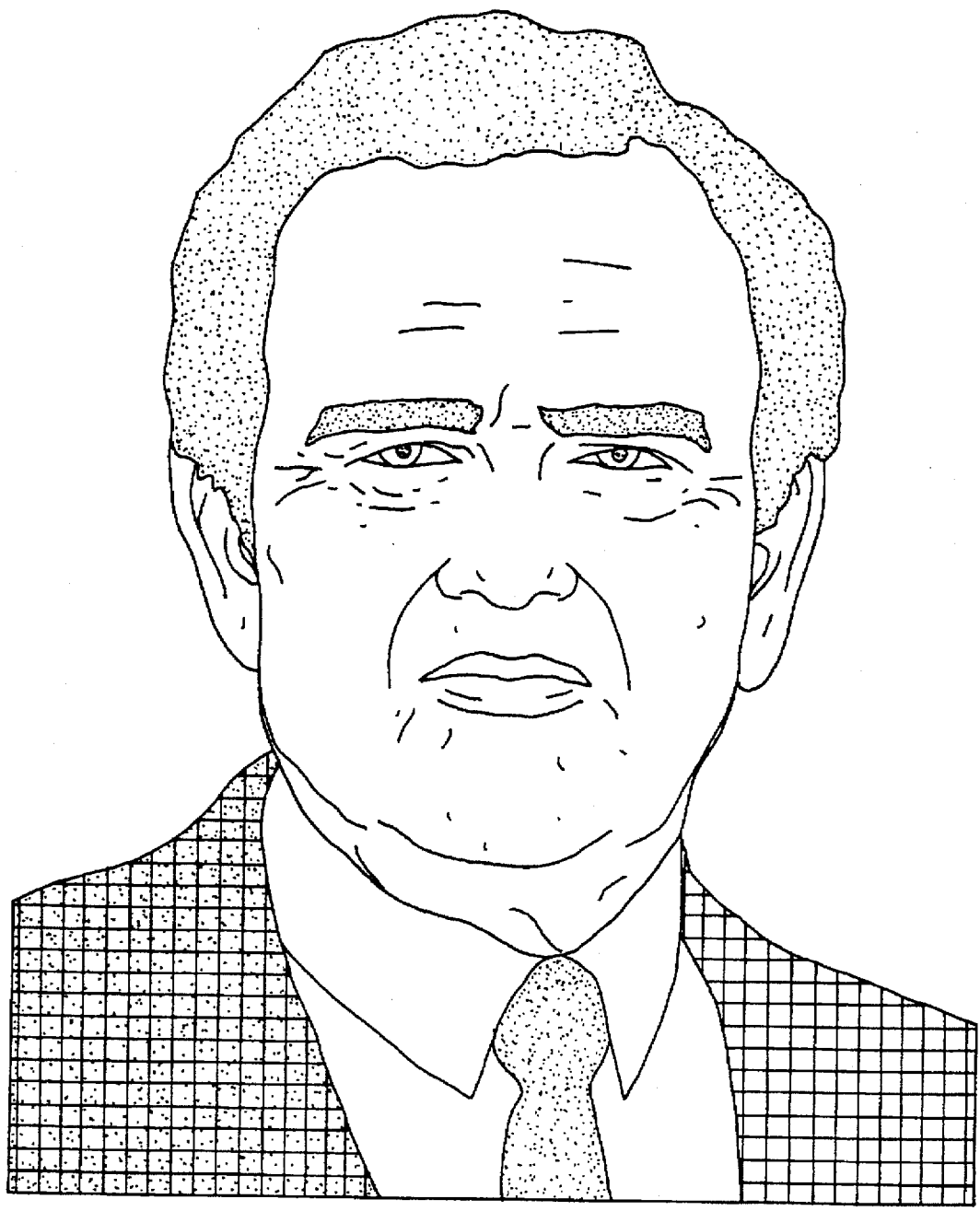
FIG. 4A is an illustration of a view of a different face from that shown in FIGS. 1–3.

If one were to desire to capture a wire frame of a second complex image, such as the face shown in FIG. 4A, one would need to go through the entire tedious and laborious process described above of capturing points for the wire frame by repeatedly identifying point sets in two images to permit calculation of depth. In accordance with the invention, creation of wire frames is vastly simplified by utilizing a prototypical or generic wire frame for the class of objects involved. For example, if the wire frame illustrated in FIG. 3 were captured, it could be utilized as a generic wire frame or a template for the creation of a wire frame of the face shown in FIG. 4A.

Figure 4B:
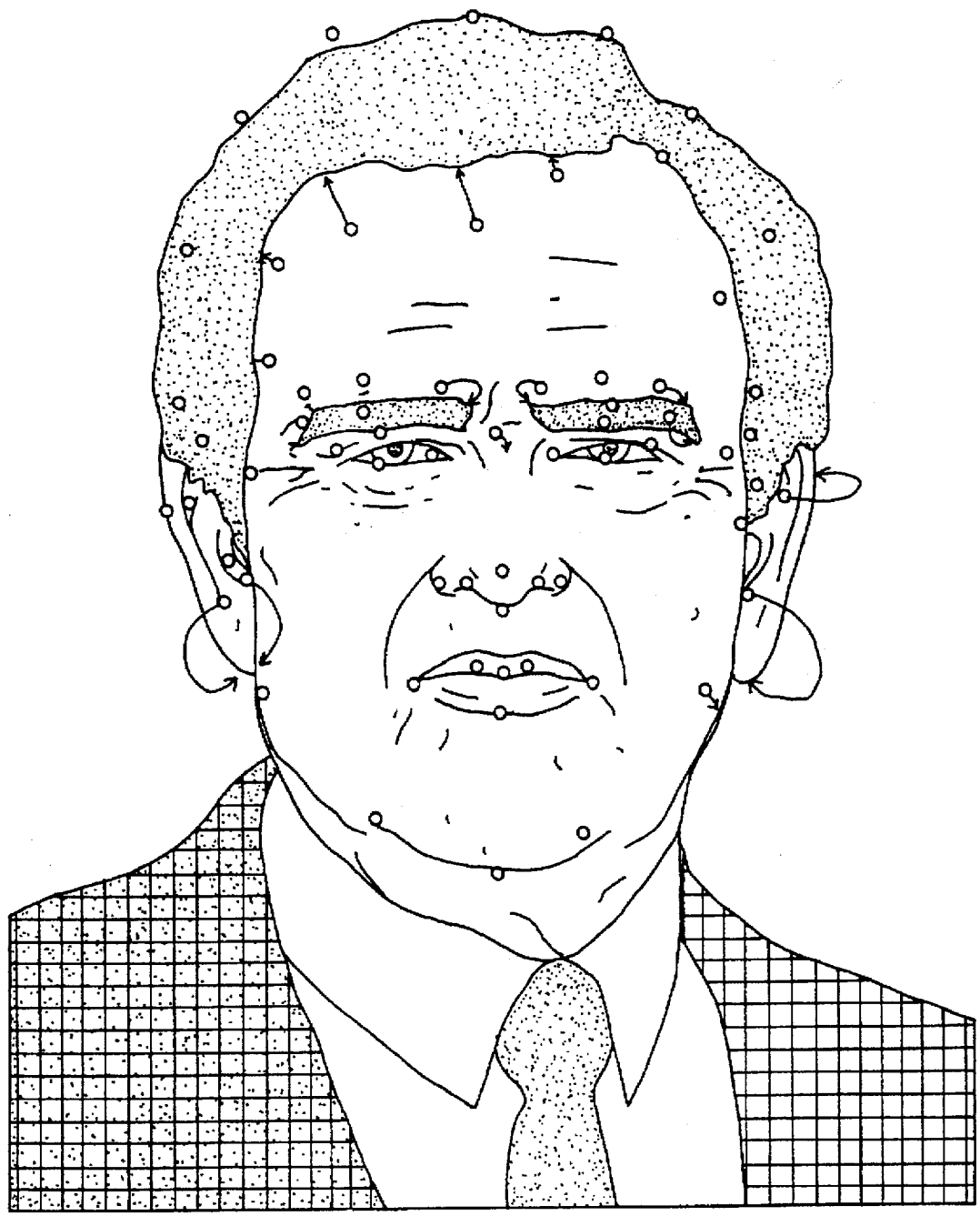
FIG. 4B shows the face of FIG. 4A with certain wire frame vertices shown in FIG. 3 superimposed.

FIG. 4B shows the wire frame of FIG. 3 overlaid on the image of FIG. 4A. The generic wire frame of FIG. 3 is comprised of vertices including, inter alia, the visually more important points for identification of a face. These include points such as the corners of the eye, the edges of the mouth, the extremes of the eyebrow, the point of the nose and points demarking the width of the nose.

Considering FIG. 4B, one point, preferably the point of the nose, is utilized to align a generic wire frame overlay on the images which are desired to be represented as a three-dimensional wire frame. One does not expect a generic wire frame to match the face to be represented in a wire frame. However, with this super position, it is a relatively easy task to modify the location of vertices by dragging and dropping on the respective images so that the points of the generic wire frame are relocated to coincide with corresponding points on the image to be captured in a wire frame representation. Thus, by editing a generic wire frame utilizing drag and drop of the respective vertices, one can modify a generic wire frame into a custom or specific wire frame which captures the particular object of the class of objects represented by the generic wire frame. In FIG. 4B, this is illustrated by arrows showing the movement of certain vertices, represented as small circles from their location in the generic wire frame to the appropriate position on image 4A. By these modifications, a generic wire frame is customized into a specific wire frame representing the image desired to be captured. This editing process is vastly simplified compared with the time and effort required to capture a wire frame from source images.

It is clear that different classes of objects would have their own prototypical or generic wire frame. For example, a wire frame of a car might be captured and utilized as a basis for the creation of new wire frames such as those associated with the design of a new vehicle without the necessity of creating the model of a new vehicle and capturing the wire frame from images of the model captured from different perspectives. In accordance with the invention, it may be desirable to provide a tool box of generic wire frames bundled with editing software to facilitate the rapid creation of custom wire frames that are suitable to a user's needs. Alternatively, one can utilize the first instance of a wire frame created for a particular instance of a class of objects and utilize that as a generic wire frame for creating additional instances having different appearances.

Figure 5:
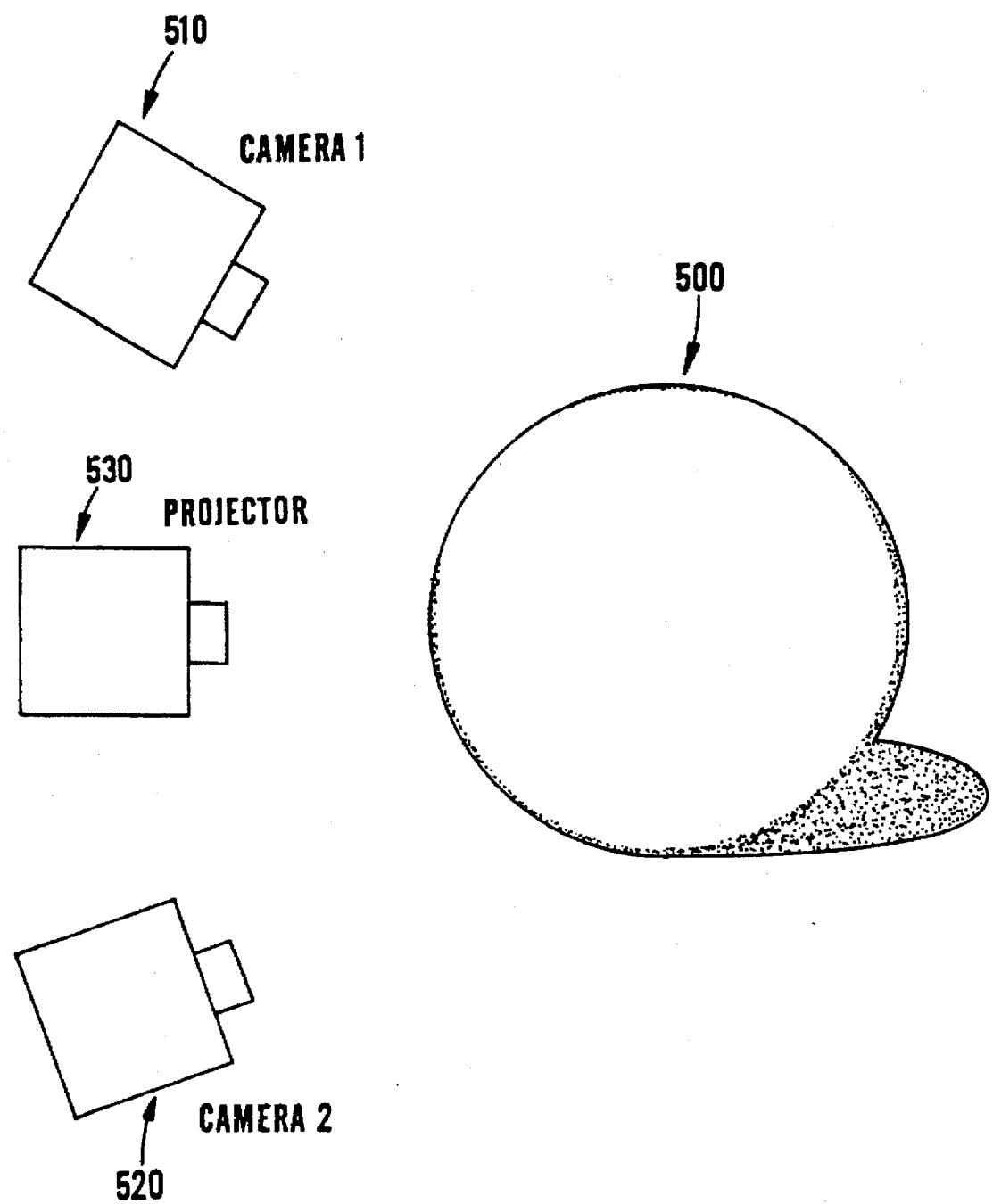
FIG. 5 is an illustration of the use of a projection to assist in the capture of wire frame information.

FIG. 5 illustrates a technique for capturing wire frame information where considerable areas of smooth surfaces exist without identifying detail which would permit the identification of point sets corresponding to a common physical point on the images captured from different perspectives. A sphere 500 with a smooth surface would be a difficult object for identifying corresponding points on two images captured by either one camera at location 510 which is then moved to location 520 or by two cameras at respective locations 510 and 520.

In accordance with the invention, projector 530 is utilized to project onto the smooth surface a pattern which can be utilized for the identification of points on the surface. In one embodiment, the pattern is a grid. However, in the preferred embodiment, the pattern is a colored confetti projection. That is, the pattern consists of projection of randomly spaced bright colored dots onto the surface. These bright colored dots would then appear in the image and could be utilized to locate corresponding points using simplified image processing of the type set forth in the aforesaid patent application Ser. No. 08/318,047 (Docket No. 2345-001). Automatic correlation techniques as described in the aforesaid application could be utilized to identify corresponding points of two images automatically using the projected patterns and a very accurate depth profile could be achieved for the smooth surface as described in the aforesaid patent application without the need for the manual entry of points on the two images.

The projection of a pattern can be utilized to identify corresponding points in two images captured with the projector on. The colored dots could then be eliminated from the captured image by image processing techniques after capture or, alternatively, one could capture rendering information in a separate image from the same camera locations with the projector off. By utilizing the projected pattern as reference points, corresponding points in the two images can be identified and a very accurate wire frame generated.

By capturing images from a number of perspectives around, above and below the object, a complete wire frame representation of the image in three dimensions can be obtained. As shown in FIG. 5 by the camera positions, each image has a perspective point of view determined by the position of the camera. The camera position is essentially the same as the perspective of a view of the image captured with the camera. The image captured differs depending upon where the camera is positioned. It can be positioned closer (zooming in), it can be positioned further away (zooming out) or it may be positioned at any location around, above or below the object.

When using a three dimensional wireframe to view an object, the position of the viewer, like the position of the camera determines what the view of the wireframe is.

Figure 6:
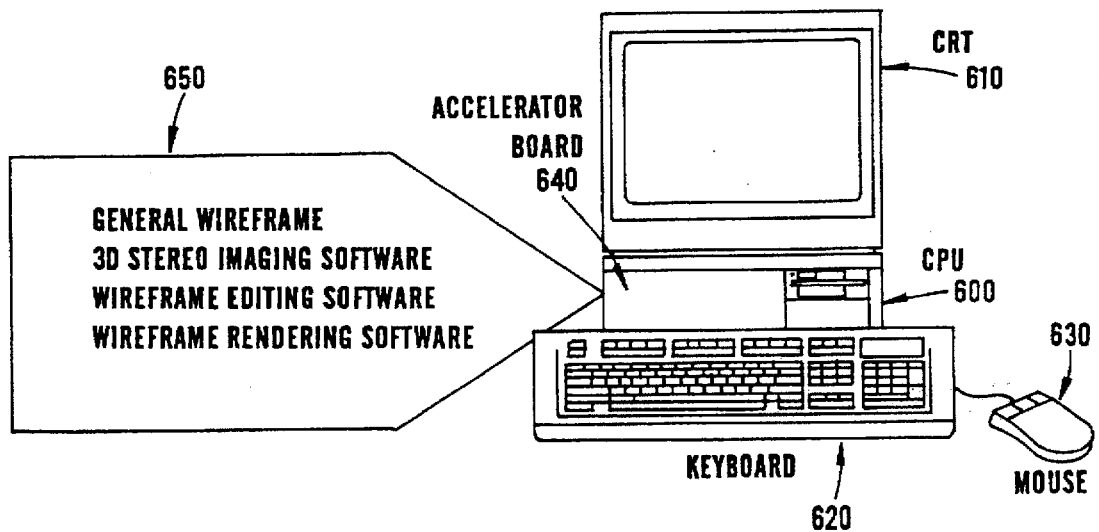
FIG. 6 is an illustration of computer apparatus suitable for implementing the invention.

FIG. 6 illustrates computer hardware and software which can be used for implementing the invention.

CPU 600 is a standard personal computer class CPU preferably of the 68486 class or better with an appropriate display 610, preferably a high resolution display input output devices comprise keyboard 620 and mouse 630 and may optionally or alternatively include any of a large number of I/O devices. The hardware compliment is supplemented with an accelerator board 640 of the type shown in application Ser. No. 08/318,047 (Docket No. 2345-001) used as described in the aforesaid application. In addition to the usual compliment of operating system and communication software, the computer is equipped with some specialized files and software as indicated in 650. A set of generic wire frames is preferably stored for access in the development of wire frames of various sorts. Software for the creation of three-dimensional stereo images is included along with software for editing wire frames as described herein. Software for rendering wire frame images is preferably a rendering package sold under the trademark Quick-Look™ from Synthonics Incorporated of Westlake Village, Calif.

Figure 7:
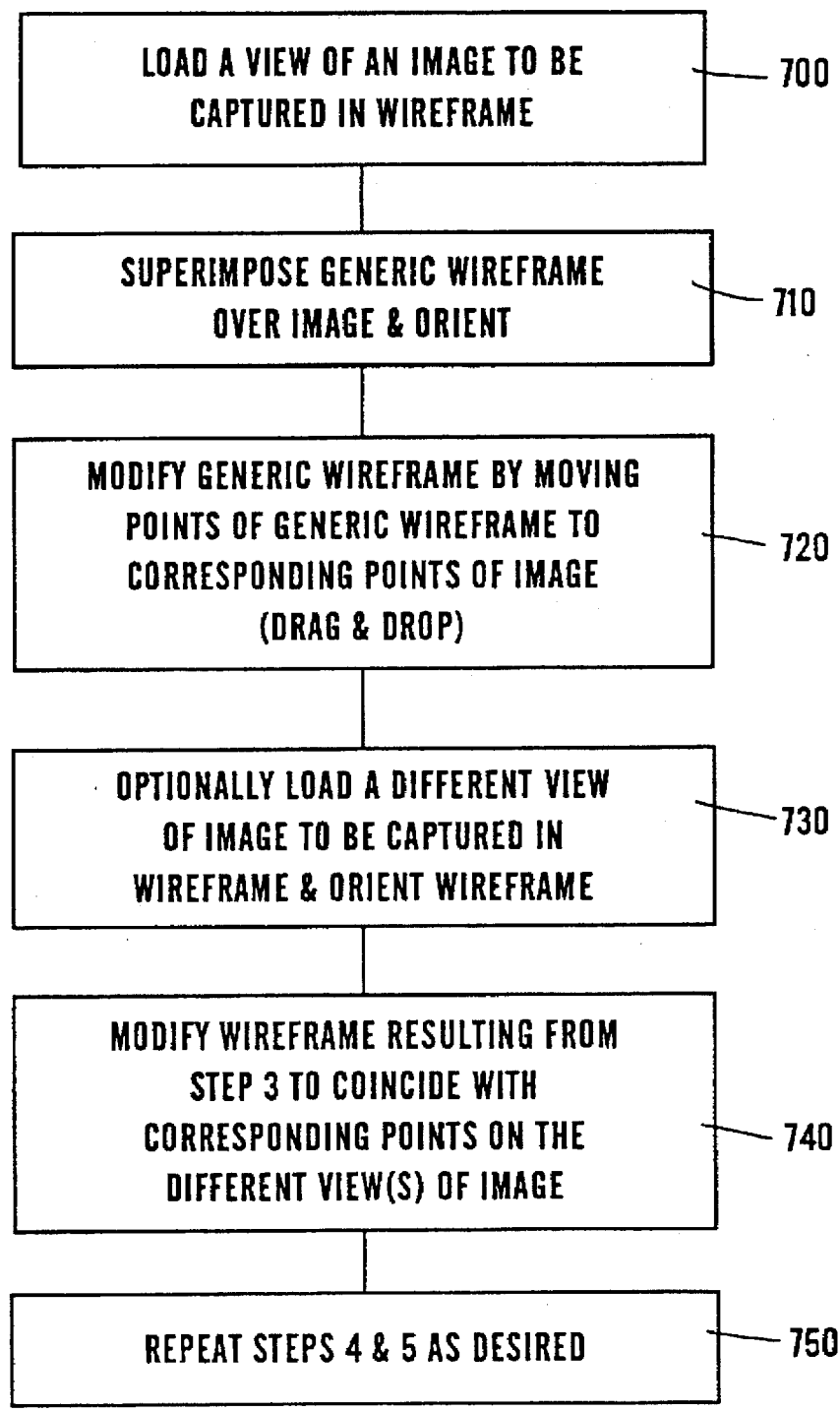
FIG. 7 is a flow chart of a method by which generic wire frames are customized to specific applications.

FIG. 7 is a flow chart of the method by which generic wire frames are customized to specific applications. At step 700, a view of one or more images to be captured in wire frame is loaded into the memory of the computer (700) and displayed on the display screen. This corresponds to image 4A, as described above. A generic wire frame, such as that illustrated in FIG. 3, is superimposed over the image loaded in step 700 and oriented so that at least one common point, such as the point of the nose, coincides with the corresponding point on the image (710).

At step 720, the generic wire frame is modified by moving points of the generic wire frame to positions which correspond to points on the image to be represented in a wire frame using drag and drop. As shown in FIG. 4B, at least some of the wire frame vertices from the generic wire frame do not coincide with what should be corresponding points on the face to be represented in wire frame. However, many of them do coincide. In FIG. 4B, only small relocations are required for vertices in the vicinity of the nose whereas more substantial relocation is required for vertices near the upper portion of the eyebrow. Using a generic wire frame, much of the tedium associated with identifying and locating vertices to be used in the creation of the wire frame is avoided. Rather, existing vertices are simply moved utilizing drag and drop techniques to new locations where they will more closely approximate the image to be captured on wire frame.

At step 730, if a full 360° generic wire frame is utilized, it is desirable to have images of the object to be represented in wire frame which view the object from perspectives which cover the entire 360° of rotation as well as above and below. Step 730 reflects this where a plurality of different views of an image to be captured in wire frame are sequentially loaded and the generic wire frame oriented to match the view of that image. Then, vertices which are not aligned with the new view of the image are adjusted using drag and drop to be appropriately located (step 740).

This process can then be repeated for as many images as are required to obtain the desired three-dimensional stereo wire frame representation.

Information about wire frame vertices or points are maintained in a point data base, a sample of which is illustrated in FIG. 8. Each vertex is assigned a point number in the order in which the point numbers are entered into the data base. Associated with each point number are the coordinates of the left image at which location the point appears and the coordinates of the right image at which the same point appears in the right view. A real world coordinate system is defined as set forth in application Ser. No. 08/414,651 (Docket No. 2345-005) and the real world coordinate system is utilized for locating points in a three-dimensional space consistently across views. Each point contains optional fields identifying the predecessor and successor point which are utilized in adding points or deleting points so that more details can be added or unnecessary details deleted from the representation.

Figure 9:
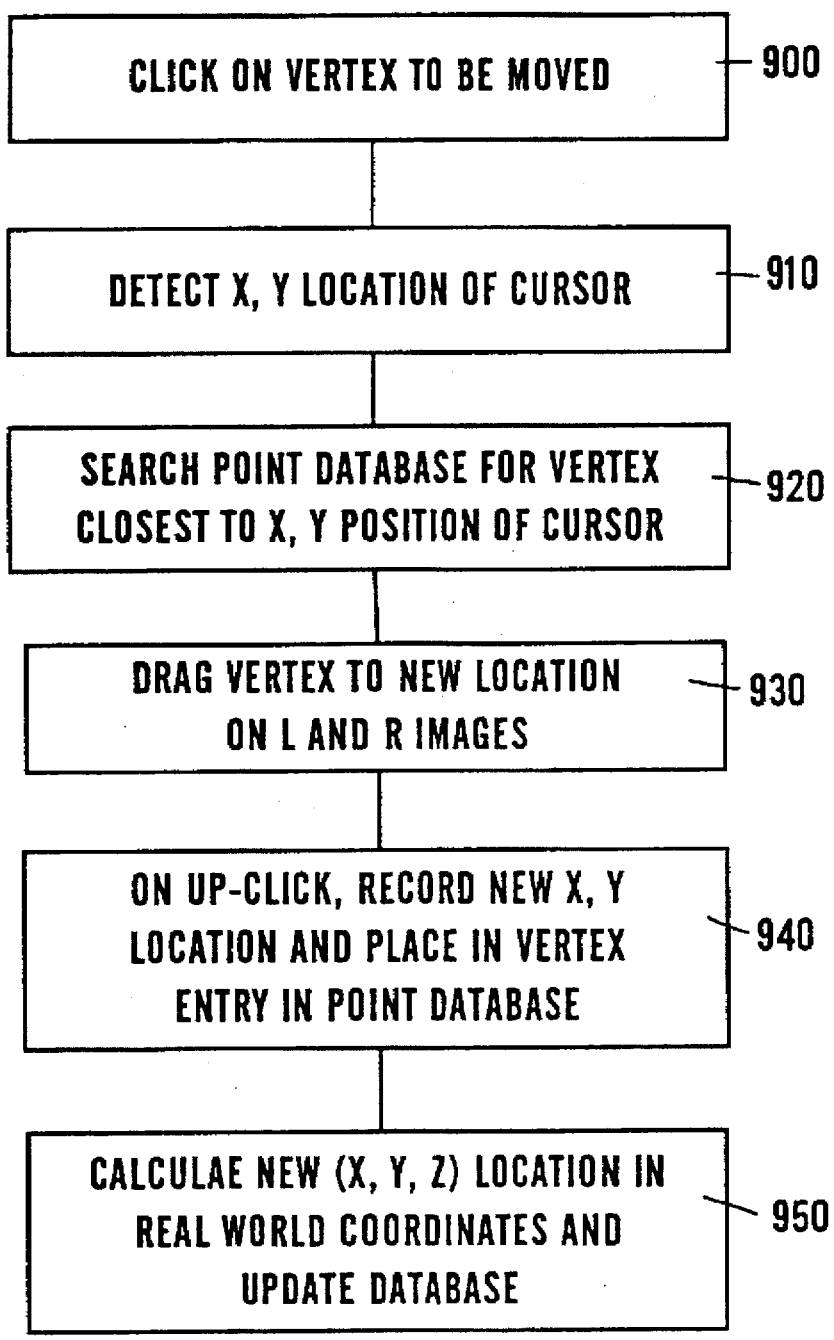
FIG. 9 is a flow chart of how to modify a vertex of a wire frame using drag and drop.

FIG. 9 is a flow chart of how to modify the location of a vertex of a wire frame using drag and drop. initially, a user places the cursor on or near the vertex to be moved and depresses a mouse button (900). Upon depression of the mouse button, the location of the cursor on the XY screen is detected (910) and a search is undertaken (920) to identify the vertex closest to the XY position of the cursor in the point data base. Holding the mouse button down, cursor is dragged to a new location on one of the left and right images and the mouse button released. When the mouse button is released, the new X and Y coordinates are recorded in the appropriate entry in the point data base. The same operation is repeated for the other of the left and right image. Once the vertex has been relocated in both the left and right images, a new XYZ location in the real world coordinate system is calculated and the database updated (950).

Figure 10:
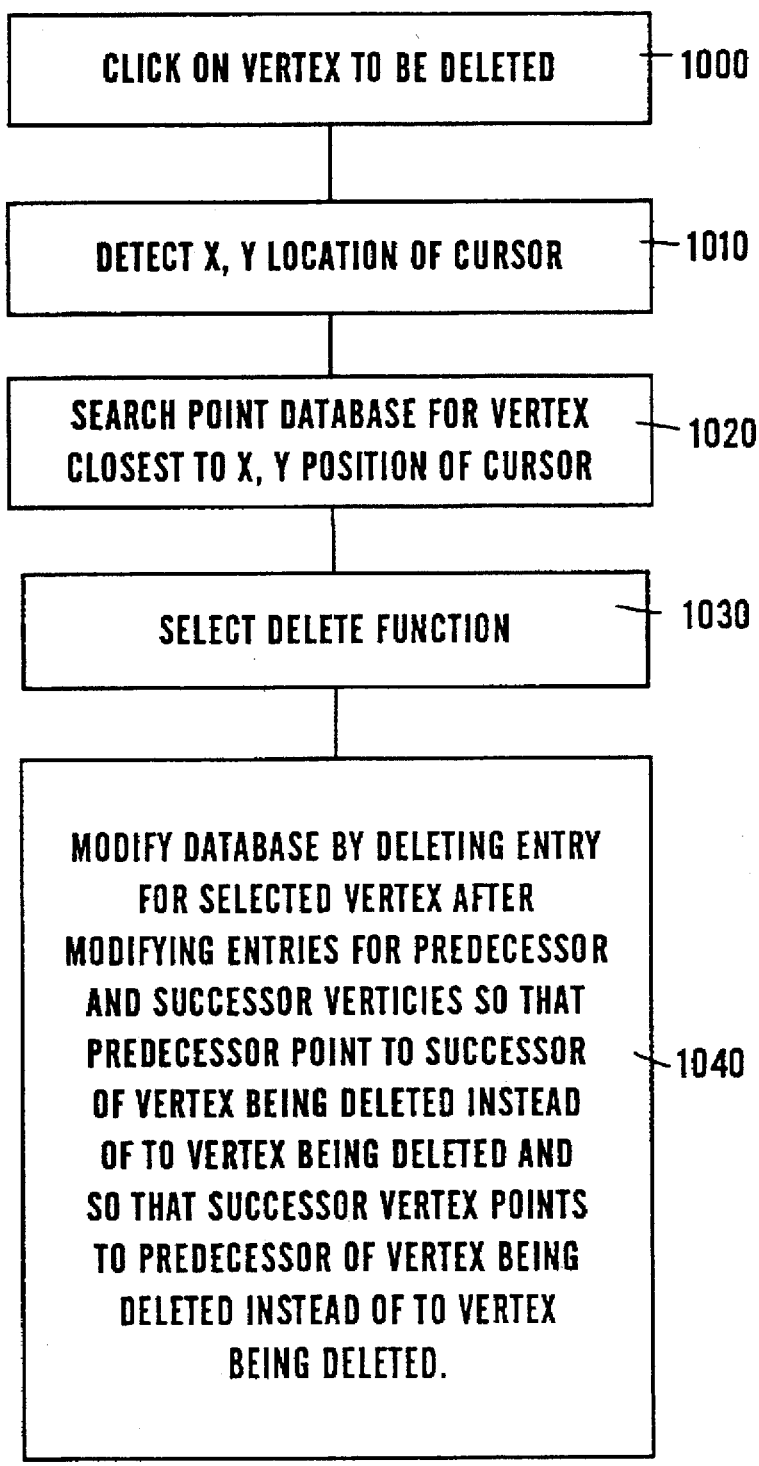
FIG. 10 is a flow chart of how to delete a vertex.

FIG. 10 is a flow chart of how a vertex can be deleted from the wire frame. Using the mouse, the cursor is placed on or near the vertex to be deleted (1000) and the mouse button depressed. The XY location of the cursor is detected (1010) and a search is undertaken to identify the vertex closest to the XY position of the cursor in the point database (1020). A "delete vertex" function is selected (1030) and executed. During execution, the point database is modified by deleting the entry for the selected vertex after modifying entries for predecessor and successor vertices so that the predecessor vertex points to the successor of the vertex being deleted instead of to the vertex being deleted and so that the successor vertex points to the predecessor of the vertex being deleted instead of to the vertex being deleted. Thus, a consistent chain of successor and predecessor vertices is maintained.

Figure 11:
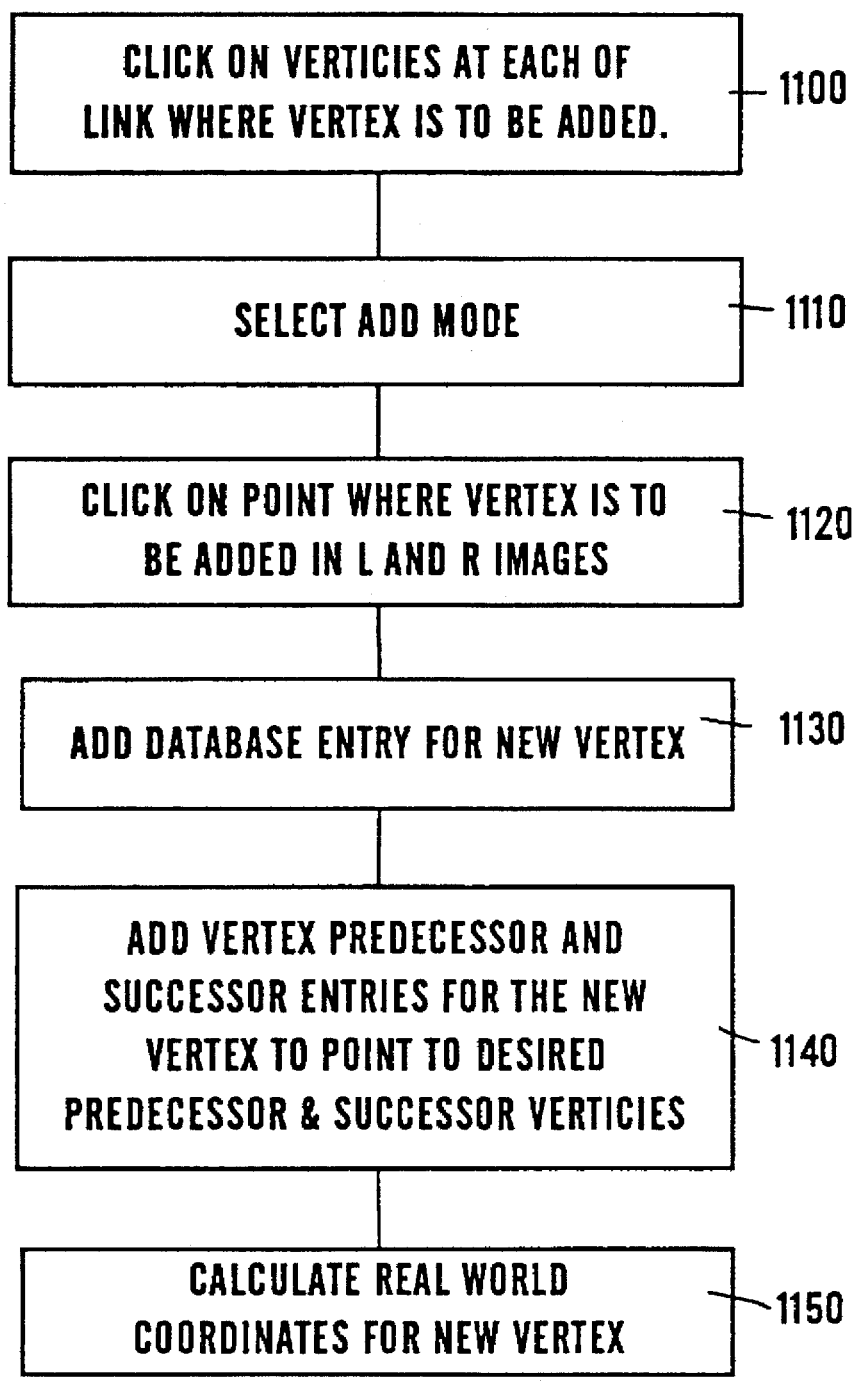
FIG. 11 is a flow chart of how to add a vertex.

FIG. 11 is a flow chart of how to add a vertex to the wire frame. Such addition may be desirable when additional detail needs to be depicted and a path between two vertices needs to be rerouted through one or more additional points. To add a vertex, one clicks on the vertices at each end of the link joining two vertices between which the additional vertex is to be added (1100) and an add execute mode is selected (1110). Then, the point where the vertex is to be added is clicked on in one of the left and right images and the corresponding point clicked on in the other of the left and right images. A new entry is added to the point database (1130) and the XY coordinates for each of the left and right images are stored in a new XYZ and the real world coordinate system calculated and inserted into the database (1130). Vertex predecessor and successor entries for the new vertex are added (1140) pointing to the predecessor and successor vertices identified at step 1100. The real world location coordinates for the new vertex are calculated (1150) and stored in the point database entry for the new vertex.

As described above, a generic three-dimensional wire frame can be edited and modified to correspond to a different desired configuration. Thus, by using generic wire frames, much of the effort associated with creating a custom wire frame is obviated in favor of simple drag and drop editing.

Figure 12:
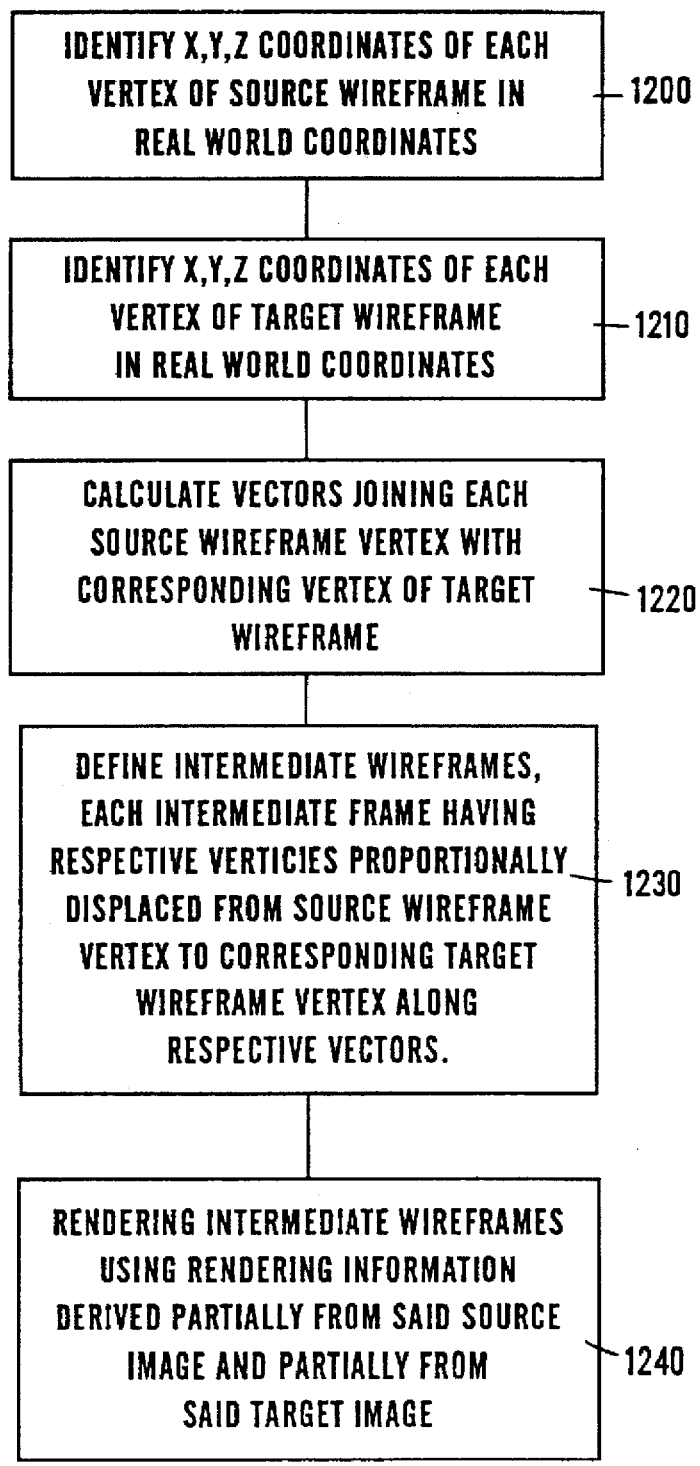
FIG. 12 is a flow chart of the process of stereo morphing one rendered wire frame stereo image into another rendered wire frame stereo image.

It is often desirable to change the shape of one image into that of another image in a relatively continuous manner. This process is called morphing. In accordance with the invention, it is possible to morph one three-dimensional wire frame into a different threedimensional wire frame. This process is reflected in FIG. 12. The XYZ coordinates of each vertex of a source wire frame are identified in real world coordinates (1200). Similarly, the XYZ coordinates of each vertex of a target wire frame are identified in real world coordinates (1210). Points on the source wire frame are paired with points on the target wire frame and vectors are calculated between the source point and the target point (1220). The transition from a source wire frame to a target wire frame occurs by defining one or more intermediate wire frames, each intermediate wire frame having respective vertices proportioning displaced from the source wire frame vertex to corresponding target wire frame vertices along respective vectors (1230). Thus, by progressing through the intermediate wire frames, a source wire frame is gradually modified into the target wire frame. Thus, the shape of source wire frame is gradually morphed into the shape of the target wire frame.

To enable three-dimensional stereo morphing to appear realistically, each of the wire frames appropriately rendered. The source wire frame rendered with a particular "skin" to make it look realistic. Similarly, the target wire frame is rendered with its realistic skin which may be quite different from that of the source wire frame. In addition to changing the shape of the source wire frame into the target wire frame in the process of morphing, it is desirable to change the external or skin appearance gradually from the source appearance to the target appearance. This is done by rendering the intermediate wire frames using rendering information derived partially from the source wire frame and partially from the target wire frame (1240). As the morphing progresses from the rendered source wire frame to the rendered target wire frame through the intermediate frames, progressively more rendering information is taken from the rendered target wire frame so that the surface appearance changes gradually and in a step-wise manner which appears to be continuous when the frames are viewed in rapid succession.

The viewer's viewpoint of a photographic image, when the image is reproduced is essentially that captured by the camera. With a three dimensional wireframe, the viewer's perspective may be located anywhere and the view of the wireframe depicted accordingly.

In prior art (two dimensional) morphing, the viewer (camera) representation, discussed in connection with FIG. 5 above, could not and did not change. However, in accordance with stereo morphing of the invention, the viewers viewpoint may change during the morphing process. This can be done by changing the apparent camera viewpoint from frame to frame between source and target viewpoints while the source wireframe is changed into the target wireframe. The bit mapped transformation of rendering information applied to surface elements during the morphing process can be adjusted to reflect the ongoing change (e.g. frame by frame) in camera (viewer) viewpoint.

In this way, stereo morphing can be achieved with the additional benefit that camera (viewer) perspective can be changed during the morphing process.

There have thus been described methods and apparatus for capturing wire frame information and for editing the wire frame information in ways which are quick and convenient when compared with the prior art. In addition, the use of generic wire frames makes possible the quick creation of wire frames by an average user without considerable technical expertise. The combination of wire frame editing and quick rendering techniques permits one to achieve the same visual effect with a coarser wire frame than has been achieved in the prior art. In addition, techniques for morphing one three-dimensional stereo object into another have been described.

In this disclosure, there is shown and described only the preferred embodiment of the invention, but, as aforementioned, it is to be understood that the invention is capable of use in various other combinations and environment and is capable of changes or modifications within the scope of the inventive concepts as expressed herein.

What we claim is:

1. Apparatus for rapidly creating wire frame representations of three dimensional objects comprising:
   a. computer having an input/output device, a display, a memory and mass storage:
   b. generic wire frames stored on said mass storage; and
   c. software, for controlling said computer, permitting a generic wire frame to be oriented so it aligns with a first view of a three dimensional object, modifying, if needed, the location of at least one vertex of the generic wire frame to overlay a feature point in said first view to create a modified wire frame, orienting said modified wire frame so it aligns with a second view of said object, and modifying the location of said vertex to overlay said feature point in said second view.

2. Apparatus of claim 1 in which the generic wire frames comprise a tool kit having a plurality of wire frames generic to a respective plurality of different objects.

3. Apparatus of claim 1 in which the software for editing includes:
   a. means for selecting a vertex of a generic wire frame and for dragging the position of said vertex from one location on the display to another location.

4. Apparatus of claim 1 in which the software for editing includes:

a. means for adding a vertex between two vertices of a wire frame.

5. Apparatus of claim 1 in which the software for editing includes:

a. means for deleting a vertex between two vertices of a wire frame.

6. Apparatus of claim 5 in which database entries of predecessor and successor vertices are altered when said vertex is deleted.

7. A method for rapidly creating a custom wire frame of a three dimensional object, comprising:

a. orienting so it aligns with a first view of an object;

b. modifying, if needed, at least one vertex of said view of said generic wire frame by dragging said vertex from an original position in the generic wire frame and dropping said vertex on a feature point of said view to create a modified wire frame;

c. orienting said modified wire frame so it aliens with a second view of said object; and d. modifying the location of said vertex to overlap said feature point in said second view.

8. The method of claim 7 further comprising rendering said custom wire frame using transformed bit mapped portions of said image.

* * * * *